United States Patent
Suzuki et al.

(10) Patent No.: US 10,256,763 B2
(45) Date of Patent: Apr. 9, 2019

(54) MOTOR CONTROL DEVICE AND ELECTRIC POWER STEERING DEVICE INCLUDING THE SAME

(71) Applicant: DENSO CORPORATION, Kariya, Aichi-pref. (JP)

(72) Inventors: Haruo Suzuki, Kariya (JP); Yoshihide Kuroda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 157 days.

(21) Appl. No.: 15/274,840

(22) Filed: Sep. 23, 2016

(65) Prior Publication Data

US 2017/0117840 A1    Apr. 27, 2017

(30) Foreign Application Priority Data

Oct. 27, 2015  (JP) .................................. 2015-210614

(51) Int. Cl.
*H02P 1/00*        (2006.01)
*H02P 29/024*    (2016.01)
(Continued)

(52) U.S. Cl.
CPC .......... *H02P 29/026* (2013.01); *B62D 5/0463* (2013.01); *B62D 5/0481* (2013.01); *H02P 27/06* (2013.01); *H02P 29/025* (2013.01)

(58) Field of Classification Search
USPC .................................. 318/400.26, 500, 490
See application file for complete search history.

(56) References Cited

U.S. PATENT DOCUMENTS 5,625,269 A  *  4/1997  Ikeda ........................ H02P 8/14
                                                                318/400.34
2008/0067960 A1*  3/2008  Maeda ................... B62D 5/046
                                                                318/400.02
(Continued)

FOREIGN PATENT DOCUMENTS

JP         2006129567 A  *  5/2006
JP         2013-159289 A       8/2012
(Continued)

*Primary Examiner* — Eduardo Colon Santana
*Assistant Examiner* — Iftekhar Mustafa
(74) *Attorney, Agent, or Firm* — Knobbe, Martens, Olson & Bear, LLP

(57) ABSTRACT

A motor control device for a motor includes: an inverter circuit supplying power of a battery to the motor; an inverter input voltage detector detecting an inverter input voltage; and a controller including a drive controller for the motor and an abnormality determination unit for determining power feeding abnormality. The abnormality determination unit determines the power feeding abnormality when the inverter input voltage is lower than a voltage threshold and a current from the battery to the inverter circuit is in a determinable range. The abnormality determination unit determines, based on a motor current electrically conducted to the motor or a rotational speed of the motor, whether the current is in the determinable range. A determination threshold in accordance with the determinable range is set that the inverter input voltage is equal to or higher than the voltage threshold when the power feeding region is normal.

9 Claims, 13 Drawing Sheets

(51) Int. Cl.
*B62D 5/04* (2006.01)
*H02P 27/06* (2006.01)

(56) References Cited

U.S. PATENT DOCUMENTS

| | | |
|---|---|---|
| 2009/0031714 A1 | 2/2009 | Jochumsen et al. |
| 2009/0043453 A1 | 2/2009 | Sakamaki et al. |
| 2009/0243525 A1* | 10/2009 | Ikeda ..................... H02P 27/06 318/400.22 |
| 2011/0066331 A1 | 3/2011 | Yamashita |
| 2016/0241183 A1* | 8/2016 | Kuramitsu .............. H02P 25/22 |

FOREIGN PATENT DOCUMENTS

| | | |
|---|---|---|
| JP | 5205981 B2 | 6/2013 |
| JP | 2015-104955 A | 6/2015 |

* cited by examiner

MOTOR CONTROL DEVICE AND ELECTRIC POWER STEERING DEVICE INCLUDING THE SAME

CROSS REFERENCE TO RELATED APPLICATION

This application is based on Japanese Patent Application No. 2015-210614 filed on Oct. 27, 2015, the disclosure of which is incorporated herein by reference.

TECHNICAL FIELD

The present disclosure relates to a motor control device and an electric power steering device including the same.

BACKGROUND

There has been known an electric power steering device which, in the case of abnormal stoppage, can specify whether a battery or a power feeder is a cause of failure. For example, in Patent Literature 1, an output voltage of a power source and a current flowing in a power feeder are detected by a battery sensor, and it is specified whether a battery or the power feeder is a cause of failure, based on the detected output voltage and the detected current flowing in the power feeder.

In Patent Literature 1, the battery sensor is provided outside an electronic control unit (ECU). Hence, the ECU needs to be provided with a terminal and a reception circuit for acquiring a detection value of the battery sensor. Further, since the battery sensor itself needs to be monitored, the device might be increased in size.

Patent Literature 1: Japanese Patent No. 5205981

SUMMARY

It is an object of the present disclosure to provide a motor control device that determines power feeding abnormality without using a detection value of a battery current, and an electric power steering device including a motor control device.

According to a first aspect of the present disclosure, a motor control device for controlling a drive of a motor includes: an inverter circuit that supplies power of a battery to the motor; an inverter input voltage detector that detects an inverter input voltage to be input into the inverter circuit; and a controller that includes a drive controller for controlling the drive of the motor, and an abnormality determination unit for determining power feeding abnormality that the power is not fed from the battery to the inverter circuit in a power feeding region between the battery and the inverter circuit. The abnormality determination unit determines that the power feeding abnormality occurs when the inverter input voltage is lower than a voltage threshold and a current from the battery to the inverter circuit is in a determinable range. The abnormality determination unit determines, based on a motor current electrically conducted to the motor or a rotational speed of the motor, whether the current is in the determinable range. A determination threshold in accordance with the determinable range is set that the inverter input voltage is equal to or higher than the voltage threshold when the power feeding region is normal.

In the above motor control device, the power feeding abnormality determination is performed based on the inverter input voltage, and the like, without using a detection value of a battery current. Hence, it is possible to simplify the device as compared with the case of using the detection value of the battery current.

Further, when power consumption in the motor is large, the current from the battery to the inverter circuit increases, to cause an increase in voltage drop by a wiring resistor in the power feeding region, leading to a decrease in inverter input voltage. In this situation, when the power feeding abnormality determination is performed simply by performing threshold determination on the inverter input voltage, the voltage drop by the wiring resistor might be erroneously determined as the power feeding abnormality. Accordingly, in the above motor control device, when the inverter input voltage is smaller than the voltage threshold and the current from the battery to the inverter circuit is in the determinable range, the power feeding abnormality is determined to have occurred. Thus, the voltage drop by the wiring resistor, which occurs due to a large current supplied from the battery to the inverter circuit, can be prevented from being erroneously determined as the power feeding abnormality.

According to a second aspect of the present disclosure, an electric power steering device includes: the motor control device according to the first aspect of the present disclosure; and the motor that outputs an auxiliary torque for assisting a steering operation of a driver.

In the above electric power steering device, the power feeding abnormality determination is performed based on the inverter input voltage, and the like, without using a detection value of a battery current. Hence, it is possible to simplify the device as compared with the case of using the detection value of the battery current.

Further, in the above electric power steering device, when the inverter input voltage is smaller than the voltage threshold and the current from the battery to the inverter circuit is in the determinable range, the power feeding abnormality is determined to have occurred. Thus, the voltage drop by the wiring resistor, which occurs due to a large current supplied from the battery to the inverter circuit, can be prevented from being erroneously determined as the power feeding abnormality.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, a motor control device according to the present disclosure and an electric power steering device including the same will be described based on the drawings. In a plurality of embodiments below, substantially the same configurations will be denoted with the same reference sign, and a repeated description thereof will be omitted.

First Embodiment

Figure 1:
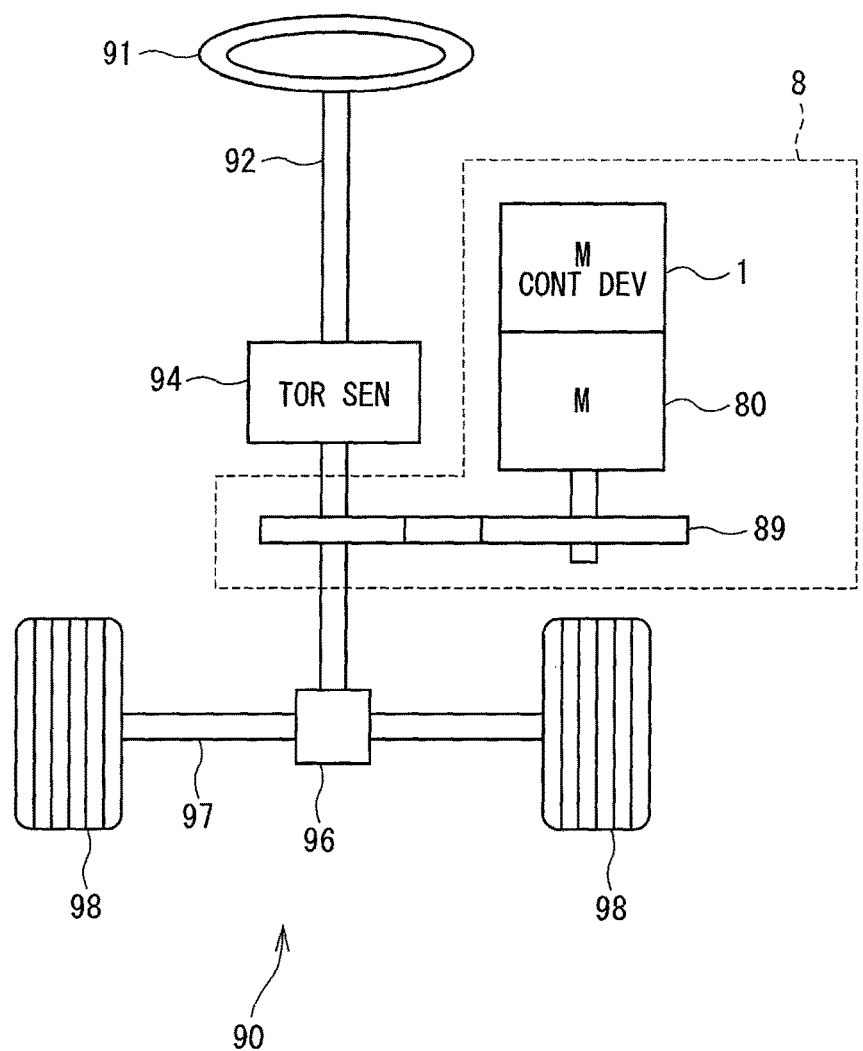
FIG. 1 is a schematic configuration diagram showing an electric power steering system according to a first embodiment of the present disclosure.
Figure 2:
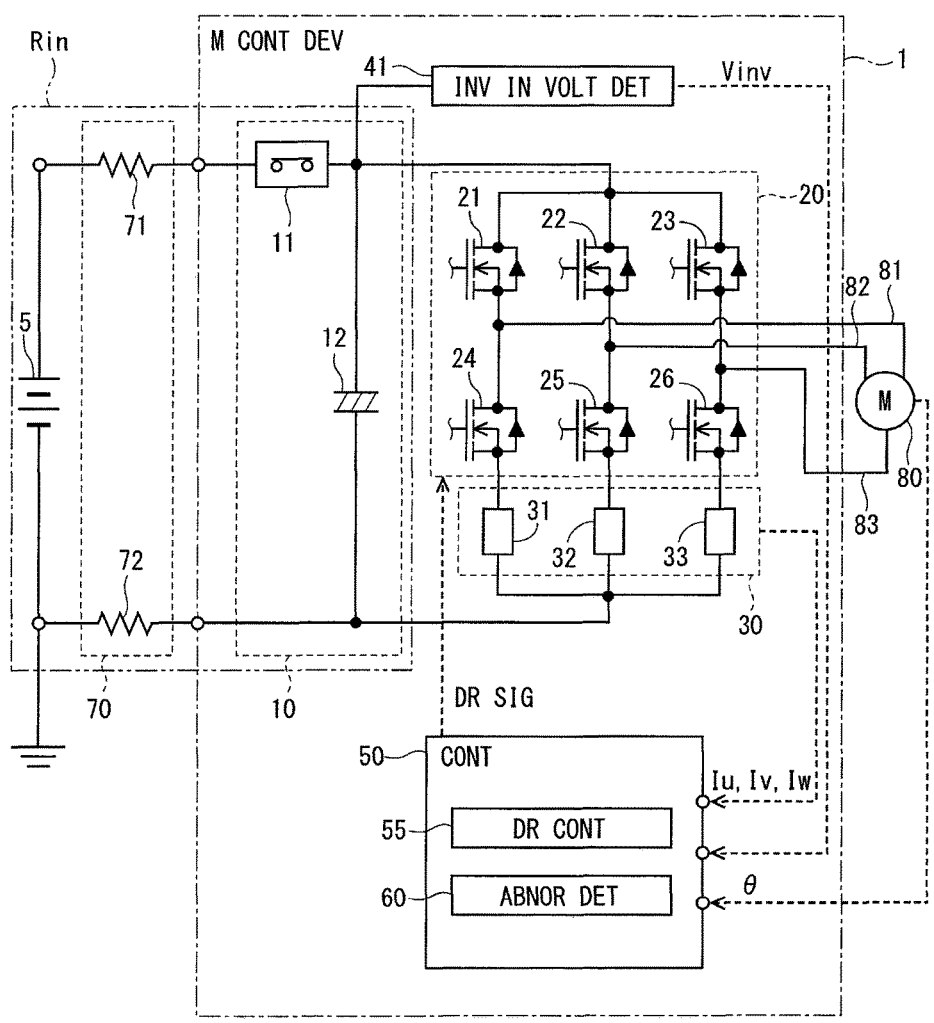
FIG. 2 is a circuit diagram showing a motor control device according to the first embodiment of the present disclosure.
Figure 3:
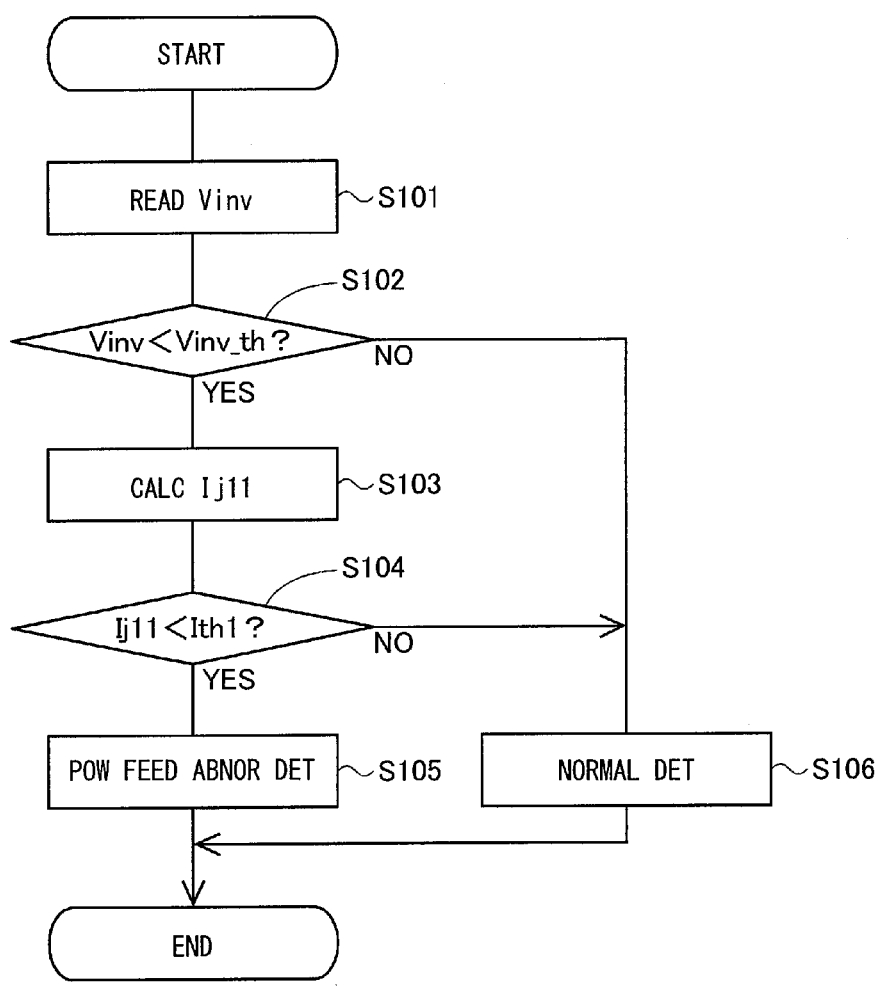
FIG. 3 is a flowchart for explaining abnormality determination processing according to the first embodiment of the present disclosure.

FIGS. 1 to 3 show a first embodiment of the present disclosure.

As shown in FIG. 1, a motor control device 1 as a rotary electric machine control device is applied to an electric power steering device 8 for assisting steering operation by a driver, in conjunction with a motor 80.

FIG. 1 shows a configuration of a steering system 90 provided with the electric power steering device 8. The steering system 90 includes a steering wheel 91 being a steering member, a steering shaft 92, a pinion gear 96, a rack shaft 97, wheels 98, the electric power steering device 8, and the like.

The steering wheel 91 is connected with the steering shaft 92. The steering shaft 92 is provided with a torque sensor 94 for detecting steering torque that is inputted by the driver operating the steering wheel 91. The pinion gear 96 is provided at the tip of the steering shaft 92. The pinion gear 96 is meshed with the rack shaft 97. A pair of wheels 98 is coupled to both ends of the rack shaft 97 through tie rods or the like.

When the driver rotates the steering wheel 91, the steering shaft 92 connected to the steering wheel 91 rotates. The rotational motion of the steering shaft 92 is converted to linear motion of the rack shaft 97 by the pinion gear 96. The pair of wheels 98 is steered at an angle in accordance with a displacement amount the rack shaft 97.

The electric power steering device 8 includes the motor 80, a reduction gear 89 that reduces the rotation of the motor 80 and transmits the rotation to the steering shaft 92, the motor control device 1, and the like. The electric power steering device 8 of the present embodiment is of a so-called "column assist type", but may be of a so-called "rack assist type" that transmits the rotation of the motor 80 to the rack shaft 97.

The motor 80 outputs assistance torque for assisting steering of the steering wheel 91 by the driver, and is driven by being supplied with power from a battery 5 (see FIG. 2), to rotate the reduction gear 89 forward and backward. The motor 80 of the present embodiment is a three-phase alternating-current (AC) blushless motor.

As shown in FIG. 2, the motor control device 1 includes a power input circuit 10, an inverter circuit 20, a current detection part 30, an inverter input voltage detection part 41, a control part 50, and the like.

The power input circuit 10 includes a power shutoff part 11 and a capacitor 12, and is provided between the battery 5 and the inverter circuit 20. The battery 5 and the power input circuit 10 are connected by use of a harness or the like. In FIG. 2, a wiring resistor 70 between the battery 5 and the power input circuit 10 is illustrated as a high potential-side resistor 71 and a low potential-side resistor 72. Hereinafter, a voltage of the battery 5 is referred to as a battery voltage Vbat.

The power shutoff part 11 can shut off power supply from the battery 5 to the inverter circuit 20 side. The capacitor 12 is connected in parallel with the battery 5 and the inverter circuit 20. The capacitor 12 stores charges to assist the power supply to the inverter circuit 20 and suppress a noise component such as a serge current.

The inverter circuit 20 includes six switching elements 21 to 26, and converts power that is supplied to the motor 80. Hereinafter, each "switching element" is referred to as a "SW element". The SW elements 21 to 23 are connected to the high potential side, and the SW elements 24 to 26 are connected to the low potential side. A connection point of the U-phase SW elements 21, 24 in pair is connected with one end of a U-phase coil 81. A connection point of the V-phase SW elements 22, 25 in pair is connected with one end of a V-phase coil 82. A connection point of the W-phase SW elements 23, 26 in pair is connected with one end of a W-phase coil 83. The other ends of the U-phase coil 81, the V-phase coil 82, and the W-phase coil 83 are connected.

The SW elements 21 to 26 of the present embodiment are metal-oxide-semiconductor field-effect transistors (MOSFETs), but they may be insulated gate bipolar transistor (IGBTs), thyristors, or the like.

The current detection part 30 includes current detection elements 31, 32, 33. The current detection elements 31 to 33 of the present embodiment are shunt resistors.

The U-phase current detection element 31 is connected to the low potential side of the SW element 24, and detects a U-phase current Iu flowing in the U-phase coil 81. An end-to-end voltage of the U-phase current detection element 31 is outputted to the control part 50 as a detection value in accordance with the U-phase current Iu.

The V-phase current detection element 32 is connected to the low potential side of the SW element 25, and detects a V-phase current Iv flowing in the V-phase coil 82. An end-to-end voltage of the V-phase current detection element 32 is outputted to the control part 50 as a detection value in accordance with the V-phase current Iv.

The W-phase current detection element 33 is connected to the low potential side of the SW element 26, and detects a W-phase current Iw flowing in the W-phase coil 83. An end-to-end voltage of the W-phase current detection element 33 is outputted to the control part 50 as a detection value in accordance with the W-phase current Iw.

The inverter input voltage detection part 41 is connected between the power shutoff part 11 and the high potential-side SW elements 21 to 23, and detects an inverter input voltage Vinv being a voltage to be inputted to the inverter circuit 20. A detection value of the inverter input voltage detection part 41 is outputted to the control part 50.

Further, a rotational angle sensor, which is not shown and detects a rotational angle θ of the motor 80, outputs a detection value in accordance with the rotational angle θ to the control part 50.

The control part 50 is configured mainly of a microcomputer. Each processing in the control part 50 may be software processing performed by a central processing unit (CPU) executing a previously stored program in a substantive memory device such as a read only memory (ROM), or may be hardware processing performed by a dedicated electronic circuit.

The control part 50 controls the drive of the motor 80, and includes a drive control part 55, an abnormality determination part 60, and the like, as a function block.

The drive control part 55 controls the drive of the motor 80 by controlling on-off operation of the SW elements 21 to 26 based on the phase currents Iu, Iv, Iw acquired from the current detection part 30, the rotational angle θ acquired from the rotational angle sensor, not shown, the steering torque acquired from the torque sensor 94, and the like. In the present embodiment, the drive control part 55 generates a drive signal that controls the on-off operation of the SW elements 21 to 26 by pulse width modulation (PWM) control for controlling a duty ratio of the SW elements 21 to 26 such that a fed-back current detection value is consistent with a current command value. The generated drive signal is outputted to gates of the SW elements 21 to 26 via a pre-driver and the like. The on-off operation of the SW elements 21 to 26 is controlled based on the drive signal.

Note that the method of controlling the motor 80 is not restricted to the PWM control, but may be any control method.

The abnormality determination part 60 determines power feeding abnormality in a power feeding region Rin being a channel from the battery 5 to the inverter circuit 20. The term "power feeding abnormality" in the present embodiment is abnormality where power cannot be supplied from the battery 5 to the inverter circuit 20, and includes braking of the harness in the power feeding region Rin, a ground fault of the power input circuit 10, and the like.

When the power feeding abnormality occurs, the inverter input voltage Vinv decreases, and the current from the battery 5 to the inverter circuit 20 also decreases.

Further, in the present embodiment, the motor 80 is used for the electric power steering device 8 with relatively large power consumption. Accordingly, with the power consumption in the motor 80 being large, the current drawn from the battery 5 to the inverter circuit 20 may increase to cause an increase in voltage drop by the wiring resistor 70, leading to a decrease in inverter input voltage Vinv. Here, if the power feeding abnormality is determined to have occurred in the power feeding region Rin when the inverter input voltage Vinv is simply lower than a predetermined value, the power feeding abnormality is erroneously determined to have occurred despite the fact that the voltage drop has occurred due to the large drawn current.

Hence, in the present embodiment, in view of the power consumption in the motor 80, the power feeding abnormality in the power feeding region Rin is determined based on the inverter input voltage Vinv.

Abnormality determination processing in the present embodiment will be described based on a flowchart shown in FIG. 3.

In Step S101, first, the abnormality determination part 60 reads the inverter input voltage Vinv. Hereinafter, "Step" of Step S101 is omitted and simply denoted by symbol "S". This also applies to the other steps.

In S102, the abnormality determination part 60 determines whether the inverter input voltage Vinv is lower than the voltage threshold Vinv_th. When the inverter input voltage Vinv is determined to be not lower than the voltage threshold Vinv_th (S102: NO), the processing proceeds to S106. When the inverter input voltage Vinv is determined to be lower than the voltage threshold Vinv_th (S102: YES), the processing proceeds to S103.

In S103, the abnormality determination part 60 reads the phase currents Iu, Iv, Iw detected by the current detection part 30, to calculate a current determination value Ij11. The current determination value Ij11 is a square-root of sum of squares of the phase currents Iu, Iv, Iw, and calculated by Formula (1).

$$Ij11 = \sqrt{\{(Iu)^2 + (Iv)^2 + (Iw)^2\}} \quad (1)$$

In S104, the abnormality determination part 60 determines whether the current determination value Ij11 is smaller than a current threshold Ith1. The current threshold Ith1 will be described later. When the current determination value Ij11 is determined to be smaller than the current threshold Ith1 (S104: YES), the current drawn from the battery 5 to the inverter circuit 20 is taken as being in the determinable range, and the processing proceeds to S105. When the current determination value Ij11 is determined to be not smaller than the current threshold Ith1 (S104: NO), the current drawn from the battery 5 to the inverter circuit 20 is taken as not being in the determinable range, and the processing proceeds to S106.

In S105 to which the processing proceeds when the inverter input voltage Vinv is lower than the voltage threshold Vinv_th and the current determination value Ij11 is smaller than the current threshold Ith1 (S102: YES, and S104: YES), it is determined that the power feeding abnormality has occurred.

In S106 to which the processing proceeds when the inverter input voltage Vinv is not lower than the voltage threshold Vinv_th (S102: NO) or the current determination value Ij11 is not smaller than the current threshold Ith1 (S104: NO), it is considered that the power feeding abnormality has not occurred, and normality determination is made.

The current threshold Ith1 will be described.

First, a lower limit of the battery voltage Vbat in the case of the entire device being normal is referred to as a battery voltage lower limit Vbat_min. For example, it is assumed that the set voltage of the battery 5 is 12 [V] and the battery voltage lower limit Vbat_min is 9 [V]. These voltage values are just examples, and can be set as appropriate. This also applies to voltage values described later as examples.

A difference between the battery voltage lower limit Vbat_min and the voltage threshold Vinv_th is referred to as a drop amount threshold ΔV_th (Formula (2)). That is, for example when the voltage threshold Vinv_th is 5 [V], the drop amount threshold ΔV_th is 4 [V].

$$\Delta V\_th = V bat\_min - V inv\_th \quad (2)$$

Here, the inverter input voltage Vinv becomes lower than the voltage threshold Vinv_th when the battery 5 is the battery voltage lower limit Vbat_min, the drawn current is large, and a voltage drop amount ΔV being a difference between the battery voltage Vbat and the inverter input voltage Vinv is larger than the drop amount threshold ΔV_th. In this case, when the abnormality determination is performed based simply on the comparison between the inverter input voltage Vinv and the voltage threshold Vinv_th, erroneous determination that the power feeding abnormality has occurred might be performed despite the fact that the power feeding abnormality has not occurred. In order to avoid such erroneous determination, in the present embodiment, the abnormality determination part 60 performs the power feeding abnormality determination in a range where the voltage drop amount ΔV is smaller than the drop amount threshold ΔV_th.

When a resistance value of the wiring resistor 70 is referred to as a wiring resistance value Rwire and the current drawn from the battery 5 to the inverter 20 is referred to as a battery current Ibat, the voltage drop amount ΔV is expressed by Formula (3).

$$\Delta V = Rwire \times Ibat \quad (3)$$

Since the wiring resistance value Rwire is a fixed parameter, the battery current threshold Ibat_th at the time of the voltage drop amount ΔV being the drop amount threshold ΔV_th is expressed by Formula (4).

$$Ibat\_th = \Delta V\_th / Rwire \quad (4)$$

In the motor control device 1, when it is assumed that the input power and the consumption power are the same, Formula (5) holds.

$$Vinv \times Ibat = Vu \times Iu + Vv \times Iv + Vw \times Iw \quad (5)$$

Further, when the voltage command values Vu*, Vv*, Vw* of the respective phases are to command rates with respect to the inverter input voltage Vinv, phase voltages Vu, Vv, Vw are expressed by Formulas (6-1) to (6-3).

$$Vu = Vinv \times Vu^* \quad (6-1)$$

$$Vv = Vinv \times Vv^* \quad (6-2)$$

$$Vw = Vinv \times Vw^* \quad (6-3)$$

When Formula (5) is transformed by use of Formulas (6-1) to (6-3), Formula (7) is obtained.

$$Ibat = Vu^* \times Iu + Vv^* \times Iv + Vw^* \times Iw \quad (7)$$

When Formula (7) is converted by use of the phase voltage command values, the square-root of sum of squares of the phase currents, and the power factor cos φ, Formula (8) is obtained.

$$Ibat = \sqrt{\{(Vu^*)^2 + (Vv^*)^2 + (Vw^*)^2\}} \times \sqrt{\{(Iu)^2 + (Iv)^2 + (Iw)^2\}} \times \cos \varphi \quad (8)$$

With the maximum value that the square-root of sum of squares of the phase voltage command values (i.e., $\sqrt{\{(Vu^*)^2 + (Vv^*)^2 + (Vw^*)^2\}}$) can take is referred to as V*max, at the time of the square-root of sum of squares of the phase voltage command values being the maximum value V*max, Formula (8) is like Formula (9).

$$Ibat/V^*max/\cos \varphi = \sqrt{\{(Iu)^2 + (Iv)^2 + (Iw)^2\}} Ibat/V^*max/\cos \varphi = Ij11 \quad (9)$$

When the battery current Ibat in Formula (9) is referred to as a battery current threshold Ibat_th, Formula (9) becomes Formulas (10-1), (10-2).

$$Ibat\_th/V^*max/\cos \varphi = Ij11(\Delta V\_th/Rwire)/V^*max/\cos \varphi = Ij11 \quad (10-1)$$

$$\{(Vbat\_min - Vinv\_th)/Rwire\}/V^*max/\cos \varphi = Ij11 \quad (10-2)$$

In the present embodiment, the current threshold Ith1 is assumed to be a value not larger than the value on the left side of Formula (10-2). Specifically, the current threshold Ith1 is set in accordance with a value obtained by dividing a value, obtained by subtracting the voltage threshold Vinv_th from the battery voltage lower limit Vbat_min, by the wiring resistance value Rwire, the maximum value V*max of the square-root of sum of squares of the phase currents, and the power factor COST. In other words, the current threshold Ith1 is set in accordance with the voltage threshold Vinv_th.

In a case where the current determination value Ij11 is smaller than the current threshold Ith1, when the voltage drop by the wiring resistor 70 is small and the power feeding abnormality has not occurred, the inverter input voltage Vinv is not lower than the voltage threshold Vinv_th. Hence, in the present embodiment, when the current determination value Ij11 is smaller than the current threshold Ith1, the current drawn from the battery 5 to the inverter circuit 20 is taken as being in the determinable range. That is, when the inverter input voltage Vinv is lower than the voltage threshold Vinv_th and the current determination value Ij11 is smaller than the current threshold Ith1, it can be determined that the inverter input voltage Vinv has decreased not due to the voltage drop accompanied by the increase in drawn current but due to the occurrence of the power feeding abnormality. Hence, it is possible to appropriately determine the power feeding abnormality.

Meanwhile, when the current determination value Ij11 is not smaller than the current threshold Ith1, the drawn current is large, to cause an increase in voltage drop by the wiring resistor 70. In such a case, the inverter input voltage Vinv may become lower than the voltage threshold Vinv_th depending on the battery voltage Vbat. Therefore, in the present embodiment, when the current determination value Ij11 is not smaller than the current threshold Ith1, the current drawn from the battery 5 to the inverter circuit 20 is taken as not being in the determinable range, and the power feeding abnormality determination is not made, but the normality determination is made. It is thereby possible to avoid the erroneous determination that the power feeding abnormality has occurred when a voltage drop has occurred due to a large drawn current.

That is, in the present embodiment, it can be considered that whether the inverter input voltage Vinv has temporarily decreased associated by an increase in drawn current or the inverter input voltage Vinv has decreased due to the power feeding abnormality is determined by monitoring the inverter input voltage Vinv and the phase currents Iu, Iv, Iw. This also applies to the other embodiments.

Note that the current threshold Ith1 is desirably set to the value on the left side of Formula (10-2), or a value as lower closest to the value on the left side of Formula (10-2) as possible. Hence, the power feeding abnormality determinable range can be held wide. This also applies to the other embodiments.

In the present embodiment, the current threshold Ith1 is assumed to be a fixed value that is previously set by performing the foregoing calculation offline. Further, in second to sixth embodiments described later, each threshold is assumed to be a fixed value as in the first embodiment. Using a fixed value as a threshold allows reduction in calculation load.

In the present embodiment, a value such as the inverter input voltage Vinv to be used for the power feeding abnormality determination can be acquired inside the motor control device 1. Thus, as compared with the case of performing the abnormality determination by use of the detection value of the battery current Ibat, the number of terminals can be reduced and the reception circuit for the detection value of the battery current Ibat can be omitted, to thereby simplify the configuration. In addition, although the battery current Ibat is used in describing the derivation process for the current threshold Ith1, the detection value of the battery current Ibat is not used in actual power feeding abnormality determination.

Further, since there is no need to limit the current command value, the voltage command value, and the like, it is possible to perform the power feeding abnormality determination without causing reduction in torque T and rotational frequency N of the motor 80.

Further, in place of the current determination value Ij11 based on the phase currents Iu, Iv, Iw described above, a current determination value Ij12 based on a d-axis current Id and a q-axis current Iq obtained by converting the phase currents Iu, Iv, Iw to dq-axis coordinates by the rotational angle θ may be used. Hereinafter, the d-axis current Id and the q-axis current Iq may be referred to as "dq-axis currents Id, Iq" as appropriate.

That is, the current determination value Ij12 is a square-root of sum of squares of the dq-axis currents Id, Iq, and expressed by Formula (11). Also when the current determination value Ij12 is used in place of the current determination value Ij11, the current threshold Ith1 is set in a similar manner.

$$Ij12=\sqrt{\{(Id)^2+(Iq)^2\}} \quad (11)$$

As described above, the motor control device 1 of the present embodiment controls the drive of the motor 80, and includes the inverter circuit 20, the inverter input voltage detection part 41, and the control part 50. The inverter circuit 20 supplies the motor 80 with the power of the battery 5. The inverter input voltage detection part 41 detects the inverter input voltage Vinv to be inputted into the inverter circuit 20.

The control part 50 includes the drive control part 55 and the abnormality determination part 60. The drive control part 55 controls the drive of the motor 80. The abnormality determination part 60 determines the power feeding abnormality where the power cannot be fed from the battery 5 to the inverter circuit 20 in the power feeding region Rin between the battery 5 and the inverter circuit 20.

When the inverter input voltage Vinv is lower than the voltage threshold Vinv_th and the current drawn from the battery 5 to the inverter circuit 20 is in the determinable range, the abnormality determination part 60 determines that the power feeding abnormality has occurred.

The determination as to whether the current is in the determinable range is performed based on a motor current that is electrically conducted to the motor 80. The determination threshold in accordance with this determination is set to such a value that the inverter input voltage Vinv is not lower than the voltage threshold Vinv_th when the power feeding region Rin is normal. In the present embodiment, each of the phase currents Iu, Iv, Iw or the dq-axis currents Id, Iq is a "motor current", and the current threshold Ith1 is a "determination threshold".

In the present embodiment, the power feeding abnormality determination is made based on the inverter input voltage Vinv, and the like, without using the detection value of the battery current Ibat. Hence, it is possible to simplify the device as compared with the case of using the detection value of the battery current Ibat.

Further, when the power consumption in the motor 80 is large, the current drawn from the battery 5 to the inverter circuit 20 may increase to cause an increase in voltage drop by the wiring resistor 70 in the power feeding region Rin, leading to a decrease in inverter input voltage Vinv. In this situation, when threshold determination is simply performed on the inverter input voltage Vinv, the voltage drop by the wiring resistor 70 might be erroneously determined as the power feeding abnormality. Hence, in the present embodiment, when the inverter input voltage Vinv is lower than the voltage threshold Vinv_th and the current drawn from the battery 5 to the inverter circuit 20 is in the determinable range, the power feeding abnormality is determined to have occurred. Thus, the voltage drop by the wiring resistor, which occurs due to a large current drawn from the battery 5 to the inverter circuit 20, can be prevented from being erroneously determined as the power feeding abnormality.

When the current determination value Ij11 or the current determination value Ij12 calculated by the motor current is smaller than the current threshold Ith1 that is the determination threshold, the abnormality determination part 60 determines that the current drawn from the battery 5 to the inverter circuit 20 is in the determinable range. In the present embodiment, the motor 80 is a three-phase AC motor, and the current determination value Ij11 is a square-root of sum of squares of the phase currents Iu, Iv, Iw. Further, the current determination value Ij12 is a square-root of sum of squares of the dq-axis currents Id, Iq.

Hence, it is possible to appropriately determine whether the current drawn from the battery 5 to the inverter circuit 20 is in the determinable range, based on the motor current. Further, when the current does not flow due to the power feeding abnormality, the phase currents Iu, Iv, Iw and the dq-axis currents Id, Iq are zero. Hence, the use of the square-root of sum of squares of the currents facilitates determination of the power feeding abnormality.

The electric power steering device 8 includes the motor control device 1 and the motor 80 that outputs assistance torque for assisting steering by the driver. In the motor control device 1 of the present embodiment, the voltage drop by the wiring resistor, which occurs due to a large current drawn from the battery 5 to the inverter circuit 20, can be prevented from being erroneously determined as the power feeding abnormality. Hence, the motor control device 1 is suitably applied to a device with relatively large power consumption, such as the electric power steering device 8. Further, since there is no need to limit the voltage command value and the current command value in the power feeding abnormality determination, it is possible to perform the power feeding abnormality determination without giving the driver a feeling of strangeness in steering.

Second Embodiment

Figure 4:
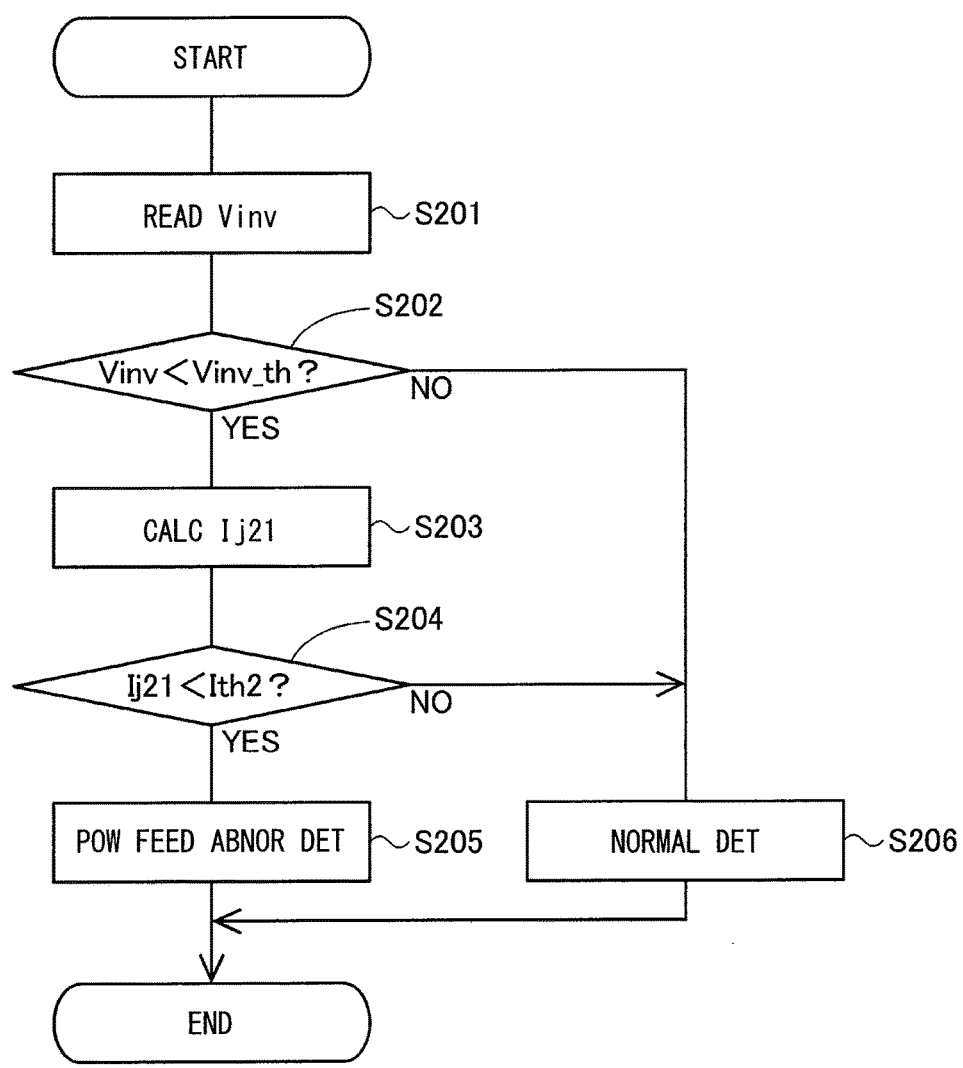
FIG. 4 is a flowchart for explaining abnormality determination processing according to a second embodiment of the present disclosure.

FIG. 4 shows a second embodiment of the present disclosure. In the present embodiment, the abnormality determination processing is different from that in the above embodiment, and hence a description will be given mainly on this respect.

The abnormality determination processing in the present embodiment will be described based on a flowchart of FIG. 4.

Processing of S201 and S202 is similar to the processing of S101 and S102 in FIG. 3.

In S203, the abnormality determination part 60 calculates a current determination value Ij21. That is, the present embodiment is different from the above embodiment in using the current determination value Ij21 in place of the current determination value Ij11 for the determination as to whether the current drawn from the battery 5 to the inverter circuit 20 is in the determinable range. The current determination value Ij21 is a value based on currents and voltages of the respective phases, and is the sum of values each obtained by multiplying the current value and the voltage value of each phase. In the present embodiment, a detection value based on a value detected by the current detection part 30 is used as the current value, and the voltage command values Vu*, Vv*, Vw* being command values are used as the voltage values (see Formula (12)).

$$Ij21=Vu^*\times Iu+Vv^*\times Iv+Vw^*\times Iw \quad (12)$$

In S204, the abnormality determination part 60 determines whether the current determination value Ij21 is smaller than a current threshold Ith2. When the current determination value Ij21 is determined to be smaller than the current threshold Ith2 (S204: YES), the current drawn from the battery 5 to the inverter circuit 20 is taken as being in the determinable range, and the processing proceeds to S205. When the current determination value Ij21 is determined to be not smaller than the current threshold Ith2 (S204: NO), the current drawn from the battery 5 to the inverter circuit 20 is taken as not being in the determinable range, and the processing proceeds to S206.

Processing of S205 and S206 is similar to the processing of S105 and S106.

The current threshold Ith2 will be described here. When the battery current Ibat in Formula (7) is defined as a battery current threshold Ibat_th, Formula (7) becomes Formulas (13-1), (13-2).

$$Ibat\_th=Vu^*\times Iu+Vv^*\times Iv+Vw^*\times Iw\Delta V\_th/Rwire=Ij21 \quad (13\text{-}1)$$

$$(Vbat\_min-Vinv\_th)/Rwire=Ij21 \quad (13\text{-}2)$$

In the present embodiment, the current threshold Ith2 is assumed to be a value not larger than the value on the left side of Formula (13-2). Specifically, the current threshold Ith2 is set in accordance with a value obtained by dividing a value, obtained by subtracting the voltage threshold Vinv_th from the battery voltage lower limit Vbat_min, by the wiring resistance value Rwire. In other words, the current threshold Ith2 is set in accordance with the voltage threshold Vinv_th.

In a case where the current determination value Ij21 is smaller than the current threshold Ith2, when the voltage drop by the wiring resistor 70 is small and the power feeding abnormality has not occurred, the inverter input voltage Vinv is not lower than the voltage threshold Vinv_th. In the present embodiment, when the current determination value Ij21 is determined to be smaller than the current threshold Ith2, the current drawn from the battery 5 to the inverter circuit 20 is taken as being in the determinable range. That is, when the inverter input voltage Vinv is lower than the voltage threshold Vinv_th and the current determination value Ij21 is smaller than the current threshold Ith2, it can be determined that the inverter input voltage Vinv has decreased not due to the voltage drop accompanied by the increase in drawn current but due to the occurrence of the power feeding abnormality. Hence, it is possible to appropriately determine the power feeding abnormality.

Meanwhile, when the current determination value Ij21 is not smaller than the current threshold Ith2, the drawn current is large, to cause an increase in voltage drop by the wiring resistor 70. In such a case, the inverter input voltage Vinv may become lower than the voltage threshold Vinv_th depending on the battery voltage Vbat. Therefore, in the present embodiment, when the current determination value Ij21 is not smaller than the current threshold Ith2, the current drawn from the battery 5 to the inverter circuit 20 is taken as not being in the determinable range, the power feeding abnormality determination is not made, but the normality determination is made. It is thereby possible to avoid the erroneous determination that the power feeding abnormality has occurred when a voltage drop has occurred due to a large drawn current.

Further, in place of the current determination value Ij21 based on the products of the currents and voltages of the respective phases described above, a current determination value Ij22 based on the product of the currents and voltages of the dq-axes may be used. That is, the current determination value Ij22 is expressed by Formula (14). Also when the current determination value Ij22 is used in place of the current determination value Ij21, the current threshold Ith2 is set in a similar manner.

$$Ij22=Vd^*\times Id+Vq^*\times Iq \quad (14)$$

In the present embodiment, the current determination value Ij21 is the sum of values each obtained by multiplying each of the phase currents Iu, Iv, Iw being the current values of the respective phases and each of the voltage command values Vu*, Vv*, Vw* being the voltage values. Further, the current determination value Ij22 is the sum of values each obtained by multiplying each of the dq-axis currents Id, Iq being the current values of the respective dq-axes and each of the dq-axis voltage command values Vd*, Vq* being the voltage values.

Hence, it is possible to appropriately determine whether the current drawn from the battery 5 to the inverter circuit 20 is in the determinable range based on the motor current. In the present embodiment, current feedback control is performed, and the value of the product of the current value and the voltage value hardly changes since the voltage command value increases when the current value decreases. Hence, the erroneous determination hardly occurs, and the power feeding abnormality determination can be performed with higher accuracy.

Further, a similar effect to that of the above embodiment is exerted.

Third Embodiment

Figure 5:
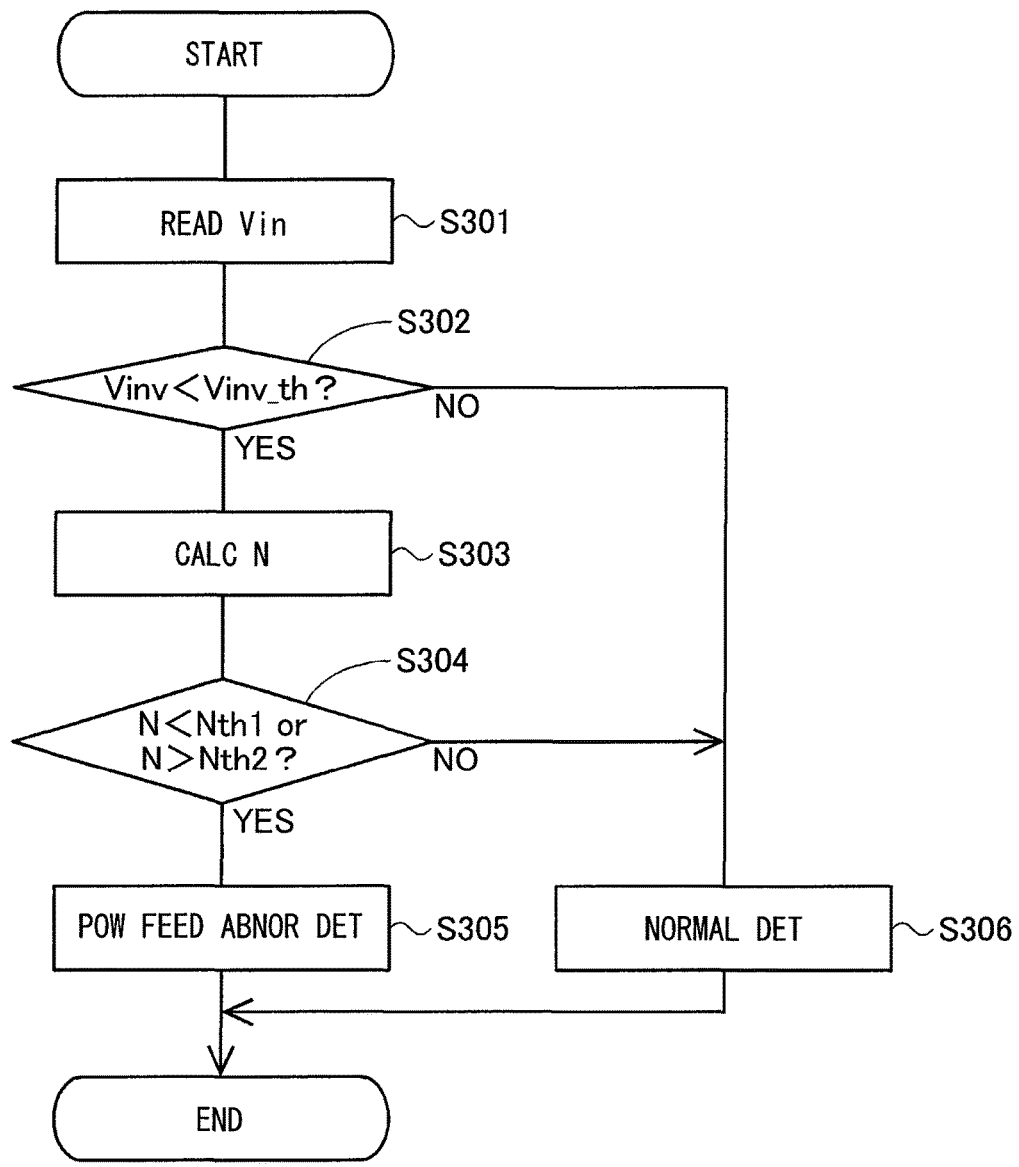
FIG. 5 is a flowchart for explaining abnormality determination processing according to a third embodiment of the present disclosure.
Figure 6:
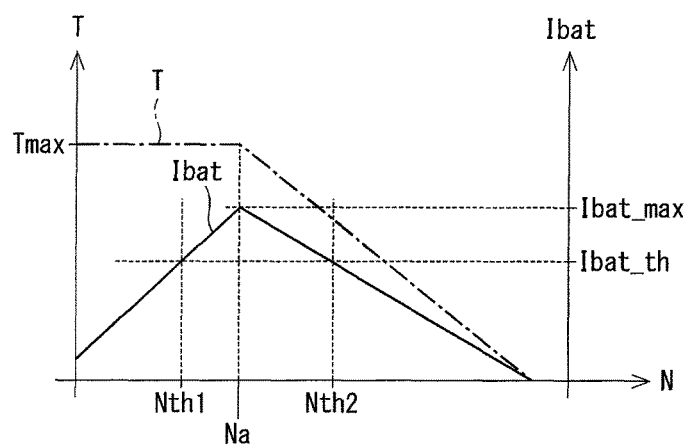
FIG. 6 is an explanatory diagram for explaining a rotational frequency threshold according to the third embodiment of the present disclosure.

FIGS. 5 and 6 show a third embodiment of the present disclosure. In the present embodiment, the abnormality determination processing is different from that in the above embodiment, and hence a description will be given mainly on this respect.

Processing of S301 and S302 is similar to the processing of S101 and S102 in FIG. 3.

In S303, the abnormality determination part 60 calculates the rotational frequency N of the motor 80 based on the rotational angle θ. When the rotational frequency N has been calculated by another control or the like, the calculated value may be acquired without the abnormality determination part 60 performing calculation.

In S304, the abnormality determination part 60 determines whether the rotational frequency N is smaller than a first rotational frequency threshold Nth1 or the rotational frequency N is larger than a second rotational frequency threshold Nth2. When the rotational frequency N is smaller than the first rotational frequency threshold Nth1 or when the rotational frequency N is larger than the second rotational frequency threshold Nth2 (S304: YES), the current drawn from the battery 5 to the inverter circuit 20 is taken as being in the determinable range, and the processing proceeds to S305. When the rotational frequency N is not smaller than the first rotational frequency threshold Nth1 or when the rotational frequency N is not larger than the second rotational frequency threshold Nth2 (S304: NO), the current drawn from the battery 5 to the inverter circuit 20 is taken as not being in the determinable range, and the processing proceeds to S306. Hereinafter, the state where the rotational frequency N is smaller than the first rotational frequency threshold Nth1 or the rotational frequency N is larger than the second rotational frequency threshold Nth2 is appropriately described as a state where "the rotational frequency N satisfies the determination condition".

Processing of S305 and S306 is similar to the processing of S105 and S106.

Here, the rotational frequency thresholds Nth1, Nth2 will be described based on FIG. 6.

FIG. 6 is a characteristic diagram showing the relation among the rotational frequency N of the motor 80, the torque T, and the battery current Ibat. In FIG. 6, the rotational frequency N is taken as a horizontal axis, and the torque T and the battery current Ibat are taken as a vertical axis.

When the rotational frequency N is not larger than a predetermined value Na, the torque T of the motor 80 becomes a torque maximum value Tmax. Further, when the rotational frequency N is larger than the predetermined value Na, the torque T decreases with increase in rotational frequency N.

When the rotational frequency N is not larger than the predetermined value Na, the battery current Ibat increases with increase in rotational frequency N. Further, when the rotational frequency N is larger than the predetermined value Na, the battery current Ibat decreases with increase in rotational frequency N. When the rotational frequency N is the predetermined value Na, the battery current Ibat becomes a current maximum value Ibat_max. Further, the battery current threshold Ibat_th becomes a smaller value than the current maximum value Ibat_max.

In the present embodiment, it is assumed that a smaller value of the rotational frequencies N with which the battery current Ibat becomes the battery current threshold Ibat_th is the first rotational frequency threshold Nth1, and a larger value thereof is the second rotational frequency threshold Nth2.

In the present embodiment, the rotational frequency thresholds Nth1, Nth2 are set based on the battery current threshold Ibat_th that is the battery current Ibat when the voltage drop amount ΔV is the drop amount threshold ΔV_th. The drop amount threshold ΔV_th is a value based on the voltage threshold Vinv_th (see Formulas (2), (4)). That is, the rotational frequency thresholds Nth1, Nth2 can be said to be values based on the voltage threshold Vinv_th.

When the rotational frequency N satisfies the determination condition, the battery current Ibat is smaller than the battery current threshold Ibat_th. For this reason, when the voltage drop by the wiring resistor 70 is small and the power feeding abnormality has not occurred, the inverter input voltage Vinv is not smaller than the voltage threshold Vinv_th. Hence, in the present embodiment, when the rotational frequency N satisfies the determination condition, the current drawn from the battery 5 to the inverter circuit 20 is taken as being in the determinable range. That is, when the inverter input voltage Vinv is smaller than the voltage threshold Vinv_th and the rotational frequency N satisfies the determination condition, it can be determined that the inverter input voltage Vinv has decreased not due to the voltage drop accompanied by the increase in drawn current but due to the occurrence of the power feeding abnormality. Hence, it is possible to appropriately determine the power feeding abnormality.

On the other hand, when the rotational frequency N is not smaller than the first rotational frequency threshold Nth1 and not larger than the second rotational frequency threshold Nth2 and the rotational frequency N does not satisfy the determination condition, the drawn current is large, to cause an increase in voltage drop by the wiring resistor 70. In such a case, the inverter input voltage Vinv may become smaller than the voltage threshold Vinv_th depending on the battery voltage Vbat. Therefore, in the present embodiment, when the rotational frequency N does not satisfy the determination condition, the current drawn from the battery 5 to the inverter circuit 20 is taken as being not in the determinable range, and the power feeding abnormality determination is not made, but the normality determination is made. It is thereby possible to avoid the erroneous determination that the power feeding abnormality has occurred when a voltage drop has occurred due to a large drawn current.

In the present embodiment, the determination as to whether the current drawn from the battery 5 to the inverter circuit 20 is in the determinable range is made based on the rotational frequency N of the motor 80. The determination threshold in accordance with this determination is set to such a value that the inverter input voltage Vinv is not smaller than the voltage threshold Vinv_th when the power feeding region Rin is normal.

As thus described, even when the rotational frequency N is used in place of the motor current, the determination as to whether the current is in the determinable range can be appropriately made.

The determination threshold is the first rotational frequency threshold Nth1, and the second rotational frequency threshold Nth2 that is a larger value than the first rotational frequency threshold Nth1. When the rotational frequency N is smaller than the first rotational frequency threshold Nth1 or when the rotational frequency N is larger than the second rotational frequency threshold Nth2, the abnormality determination part 60 determines that the current drawn from the battery 5 to the inverter circuit 20 is in the determinable range.

Hence, it is possible to appropriately determine whether the current drawn from the battery 5 to the inverter circuit 20 is in the determinable range based on the rotational frequency N of the motor 80.

Further, a similar effect to those of the above embodiments is exerted.

In the present embodiment, the rotational frequency N corresponds to a "rotational speed", the first rotational frequency threshold Nth1 corresponds to a "first speed threshold", and the second rotational frequency threshold Nth2 corresponds to a "second speed threshold". This also applies to a sixth embodiment, and the like.

Fourth Embodiment

Figure 7:
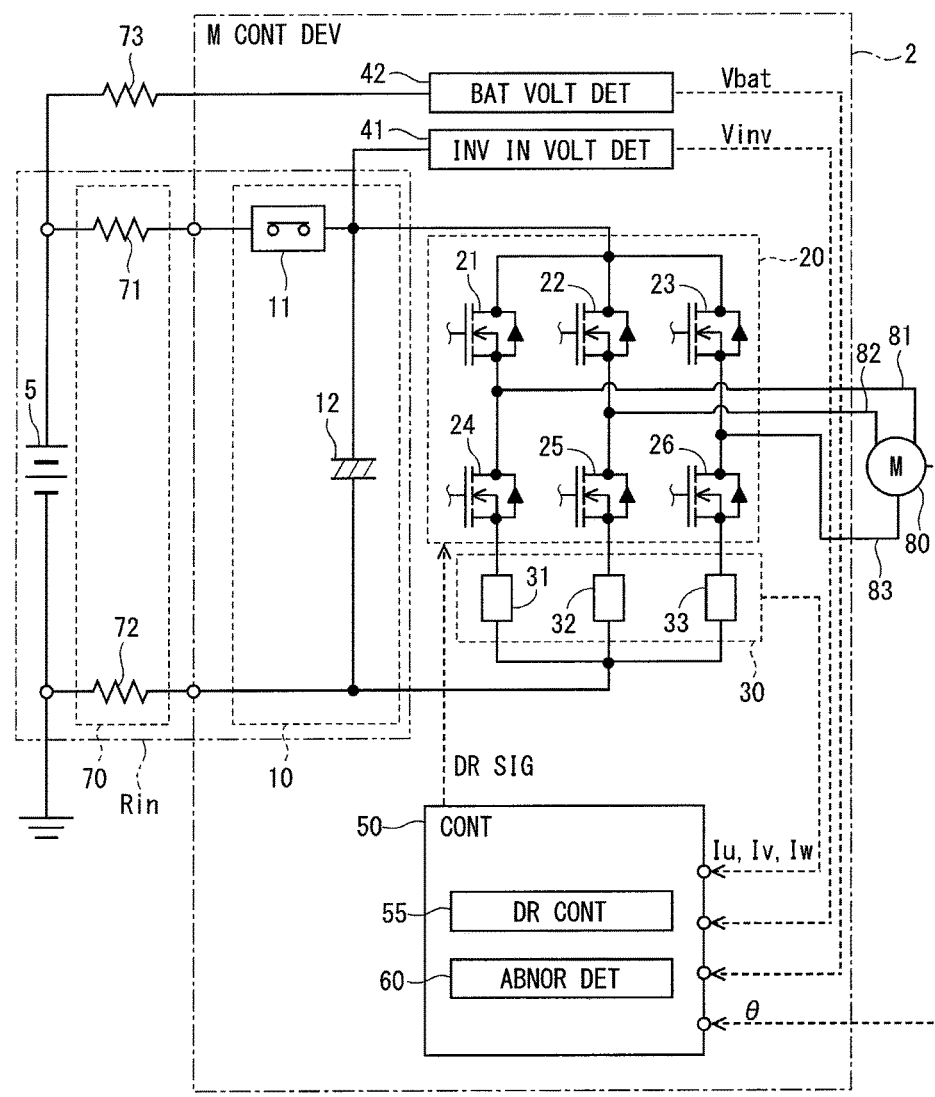
FIG. 7 is a circuit diagram showing a motor control device according to a fourth embodiment of the present disclosure.
Figure 8:
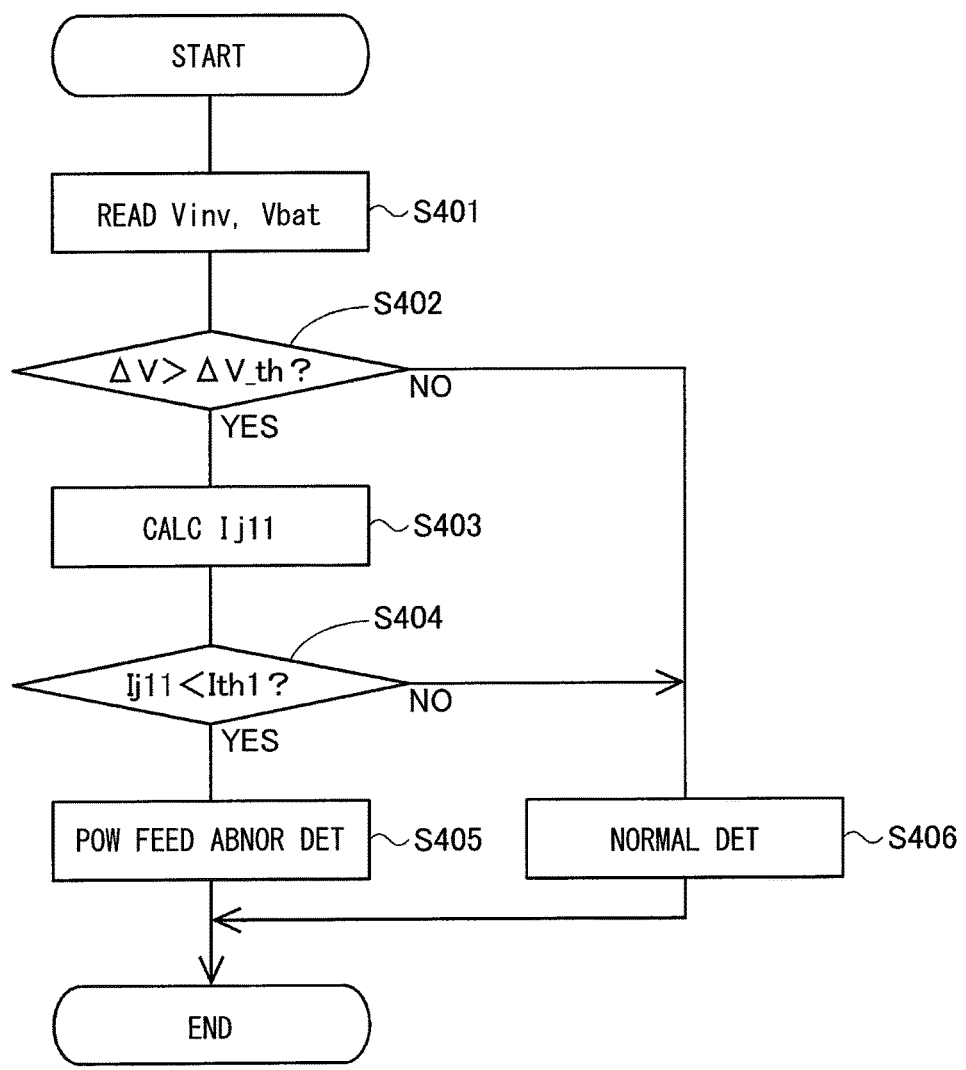
FIG. 8 is a flowchart for explaining abnormality determination processing according to the fourth embodiment of the present disclosure.

FIGS. 7 and 8 show a fourth embodiment of the present disclosure.

As shown in FIG. 7, a motor control device 2 includes the power input circuit 10, the inverter circuit 20, the current detection part 30, the inverter input voltage detection part 41, a battery voltage detection part 42, the control part 50, and the like.

The battery voltage detection part 42 detects the battery voltage Vbat being the voltage of the battery 5, and outputs the detection value to the control part 50. Strictly speaking, the voltage detected by the battery voltage detection part 42 becomes lower than the battery voltage Vbat in accordance with a current Iig that flows in a wiring resistor 73. In the present embodiment, the current Iig is assumed to be sufficiently small, and a voltage detected by the battery voltage detection part 42 is taken as the battery voltage Vbat. Note that the battery voltage Vbat is a value normally acquired in the motor control device 2 that is applied to the electric power steering device 8.

The control part 50 acquires a detection value in accordance with the battery voltage Vbat in addition to detection values in accordance with the phase currents Iu, Iv, Iw, the rotational angle θ, and the inverter input voltage Vinv. In the present embodiment, the control part 50 acquires the battery voltage Vbat, and the abnormality determination part 60 determines the power feeding abnormality based on the voltage drop amount ΔV being a difference between the battery voltage Vbat and the inverter input voltage Vinv.

The abnormality determination processing in the present embodiment will be described based on a flowchart of FIG. 8.

In S401, the abnormality determination part 60 reads the inverter input voltage Vinv and the battery voltage Vbat.

In S402, the abnormality determination part 60 determines whether the voltage drop amount ΔV is larger than the drop amount threshold ΔV_th. When the voltage drop amount ΔV is determined to be not larger than the drop amount threshold ΔV_th (S402: NO), the inverter input voltage Vinv is taken as being not smaller than the voltage threshold Vinv_th, and the processing proceeds to S406. When the voltage drop amount ΔV is determined to be larger than the drop amount threshold ΔV_th (S402: YES), the inverter input voltage Vinv is taken as being smaller than the voltage threshold Vinv_th, and the processing proceeds to S403.

Processing of S403 to S406 is similar to the processing of S103 to S106 in FIG. 3.

The drop amount threshold ΔV_th and the current threshold Ith1 are similar to those in the first embodiment (see, for example, Formulas (2), (10)). In addition, it can also be said that the current threshold Ith1 is set in accordance with the drop amount threshold ΔV_th as seen in Formula (10-1).

Further, similarly to the first embodiment, in place of the current determination value Ij11, the current determination value Ij12 based on the dq-axis currents Id, Iq may be used.

In a case where the current determination value Ij11 is smaller than the current threshold Ith1, when the voltage drop by the wiring resistor 70 is small and the power feeding abnormality has not occurred, the voltage drop amount ΔV is not larger than the drop amount threshold ΔV_th. In the present embodiment, when the voltage drop amount ΔV is larger than the drop amount threshold ΔV_th and the current determination value Ij11 is smaller than the current threshold Ith1, the voltage drop can be determined to be not the voltage drop due to the increase in drawn current, but the voltage drop due to the occurrence of the power feeding abnormality. Hence, it is possible to appropriately determine the power feeding abnormality.

Meanwhile, when the current determination value Ij11 is not smaller than the current threshold Ith1, the drawn current is large, to cause an increase in voltage drop by the wiring resistor 70. In such a case, the voltage drop amount ΔV may become larger than the drop amount threshold ΔV_th depending on the battery voltage Vbat. Therefore, in the present embodiment, when the current determination value Ij11 is not smaller than the current threshold Ith1, the current drawn from the battery 5 to the inverter circuit 20 is taken as not being in the determinable range, and the power feeding abnormality determination is not made, but the normality determination is made. It is thereby possible to avoid the erroneous determination that the power feeding abnormality has occurred when a voltage drop has occurred due to a large drawn current.

The motor control device 2 further includes the battery voltage detection part 42 that detects the battery voltage Vbat being the voltage of the battery 5.

When the voltage drop amount ΔV being a difference between the battery voltage Vbat and the inverter input voltage Vinv is larger than the drop amount threshold ΔV_th, the abnormality determination part 60 takes the inverter input voltage Vinv as being smaller than the voltage threshold Vinv_th.

Also in this manner, a similar effect to those of the above embodiments is exerted.

Fifth Embodiment

Figure 9:
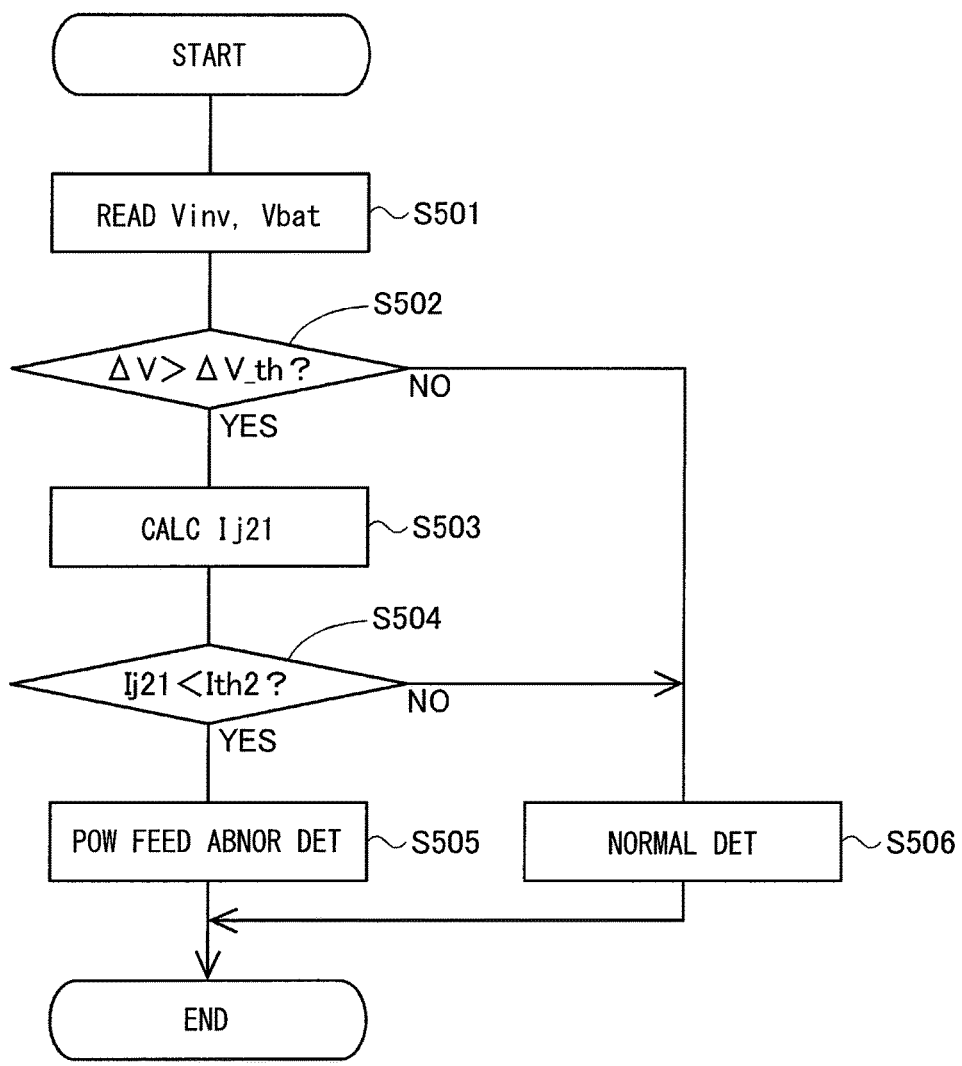
FIG. 9 is a flowchart for explaining abnormality determination processing according to a fifth embodiment of the present disclosure.

FIG. 9 shows a fifth embodiment of the present disclosure. In the present embodiment, the abnormality determination processing is different from that in the fourth embodiment, and hence a description will be given mainly on this respect.

The abnormality determination processing in the present embodiment will be described based on a flowchart of FIG. 9.

Processing of S501 and S502 is similar to the processing of S401 and S402 in FIG. 8.

Processing of S503 to S506 is similar to the processing of S203 to S506 in FIG. 4.

The current threshold Ith2 is similar to that in the second embodiment (see Formula (13)). In addition, it can also be said that the current threshold Ith2 is set in accordance with the drop amount threshold ΔV_th as seen in Formula (13-1).

Further, similarly to the second embodiment, in place of the current determination value Ij21, a current determination value Ij22 based on the product of the currents and voltages of the dq-axes may be used.

In a case where the current determination value Ij21 is smaller than the current threshold Ith2, when the voltage drop by the wiring resistor 70 is small and the power feeding abnormality has not occurred, the voltage drop amount ΔV is not larger than the drop amount threshold ΔV_th. In the present embodiment, when the voltage drop amount ΔV is larger than the drop amount threshold ΔV_th and the current determination value Ij21 is smaller than the current threshold Ith2, the voltage drop can be determined to be not the voltage drop due to the increase in drawn current, but the voltage drop due to the occurrence of the power feeding abnormality. Hence, it is possible to appropriately determine the power feeding abnormality.

Meanwhile, when the current determination value Ij21 is not smaller than the current threshold Ith2, the drawn current is large, to cause an increase in voltage drop by the wiring resistor 70. In such a case, the voltage drop amount ΔV may become larger than the drop amount threshold ΔV_th depending on the battery voltage Vbat. Therefore, in the present embodiment, when the current determination value Ij21 is not smaller than the current threshold Ith1, the current drawn from the battery 5 to the inverter circuit 20 is taken as not being in the determinable range, the power feeding abnormality determination is not made, but the normality determination is made. It is thereby possible to avoid the erroneous determination that the power feeding abnormality has occurred when a voltage drop has occurred due to a large drawn current.

Also in this manner, a similar effect to that of the above embodiment is exerted.

Sixth Embodiment

Figure 10:
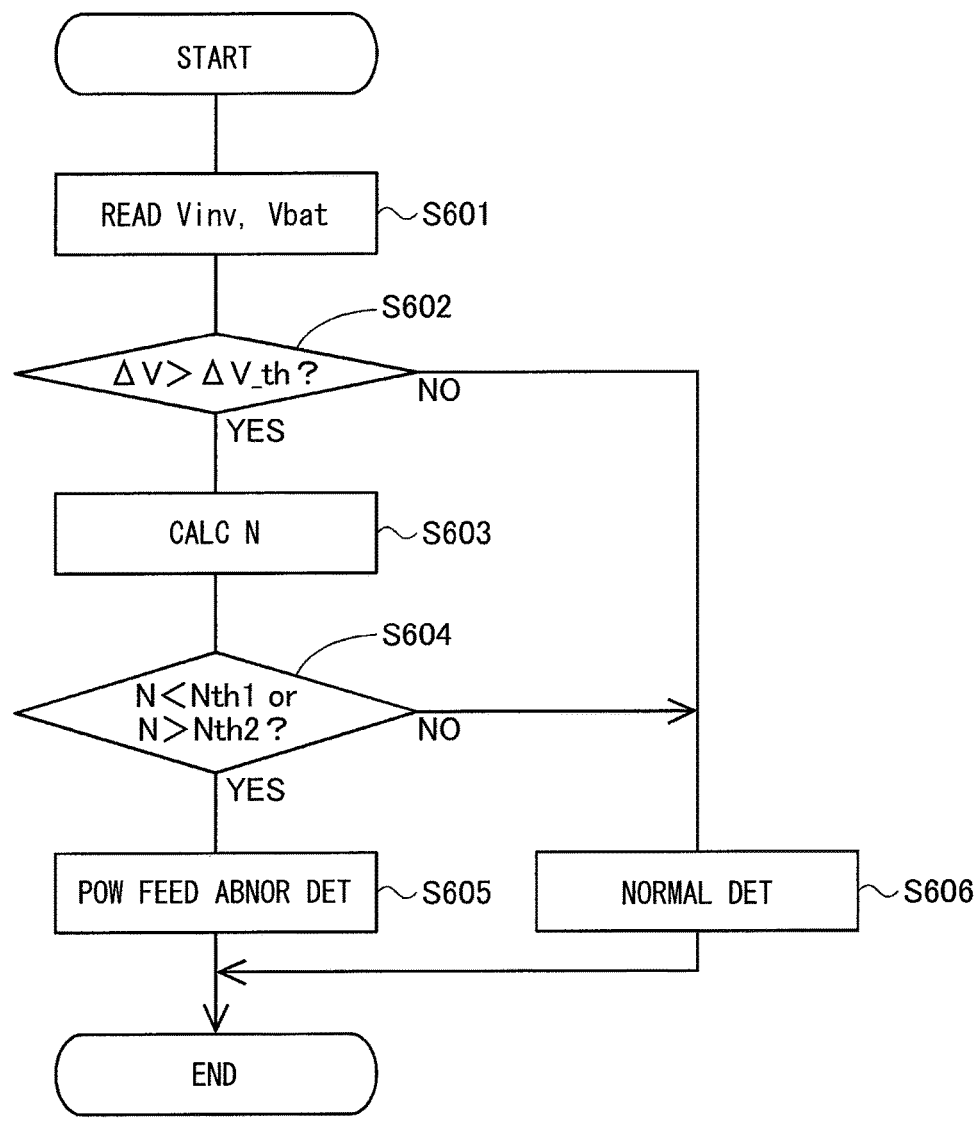
FIG. 10 is a flowchart for explaining abnormality determination processing according to a sixth embodiment of the present disclosure.

FIG. 10 shows a sixth embodiment of the present embodiment. In the present embodiment, the abnormality determination processing is different from that in the fourth embodiment, and hence a description will be given mainly on this respect.

Processing of S601 and S602 is similar to the processing of S401 and S402 in FIG. 8.

Processing of S603 to S606 is similar to the processing of S303 to S306 in FIG. 3.

The rotational frequency thresholds Nth1, Nth2 are similar to those in the third embodiment.

In the present embodiment, when the rotational frequency N satisfies the determination condition, the battery current Ibat is smaller than Ibat_th described above. For this reason, when the voltage drop by the wiring resistor 70 is small and the power feeding abnormality has not occurred, the voltage drop amount $\Delta V$ is not larger than the drop amount threshold $\Delta V\_th$. In the present embodiment, when the voltage drop amount $\Delta V$ is larger than the voltage drop amount threshold $\Delta V\_th$ and the rotational frequency N satisfies the determination condition, it can be determined that the inverter input voltage Vinv has decreased not due to the voltage drop accompanied by the increase in drawn current but due to the occurrence of the power feeding abnormality. Hence, it is possible to appropriately determine the power feeding abnormality.

On the other hand, when the rotational frequency N does not satisfy the determination condition, the drawn current is large, to cause an increase in voltage drop by the wiring resistor 70. In such a case, the voltage drop amount $\Delta V$ may become larger than the drop amount threshold $\Delta V\_th$ depending on the battery voltage Vbat. Therefore, in the present embodiment, when the rotational frequency N does not satisfy the determination condition, the current drawn from the battery 5 to the inverter circuit 20 is taken as being not in the determinable range, and the power feeding abnormality determination is not made, but the normality determination is made. It is thereby possible to avoid the erroneous determination that the power feeding abnormality has occurred when a voltage drop has occurred due to a large drawn current.

Also in this manner, a similar effect to those of the above embodiments is exerted.

Seventh Embodiment

Figure 11:
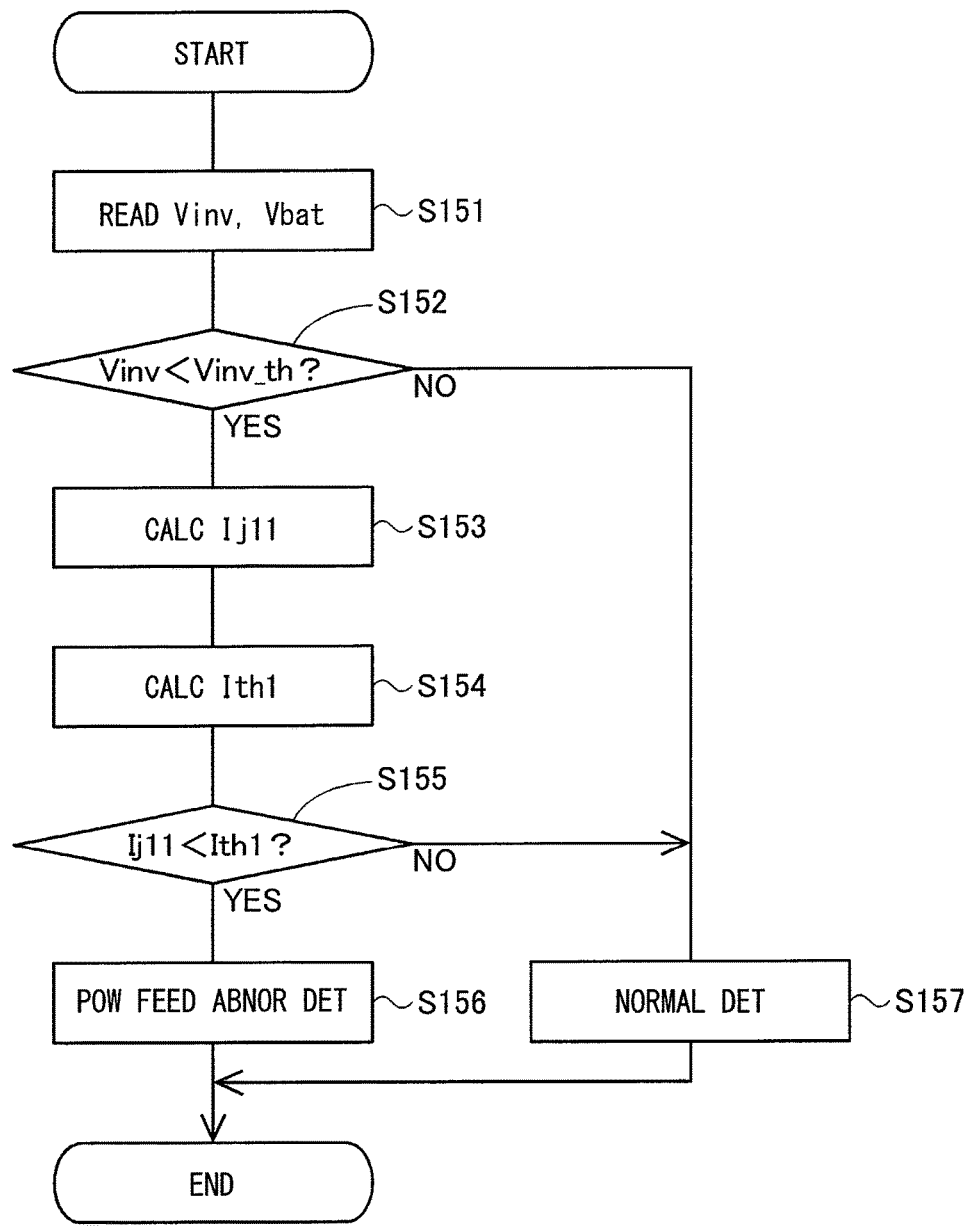
FIG. 11 is a flowchart for explaining abnormality determination processing according to a seventh embodiment of the present disclosure.

FIG. 11 shows a seventh embodiment of the present disclosure.

The abnormality determination processing in the present embodiment will be described based on a flowchart of FIG. 11. In S151, the abnormality determination part 60 reads the inverter input voltage Vinv and the battery voltage Vbat.

Processing of S152 and S153 is similar to the processing of S102 and S103 in FIG. 3.

In S154, the abnormality determination part 60 calculates the current threshold Ith1 based on the battery voltage Vbat. Specifically, the battery voltage Vbat acquired in S151 is used in place of the battery voltage lower limit Vbat_min of Formula (2). The other derivation processes are similar to those in the above embodiments, and the current threshold Ith1 is set so as to be a value not larger than the value on the left side of Formula (10). The current threshold Ith1 may be set by performing as needed the above calculation using the battery voltage Vbat, or may be set by previously preparing a map where the battery voltage Vbat is associated with the current threshold Ith1, and then performing calculation based on the map.

Note that the current threshold Ith1 may be calculated at any timing from S151 to S155, such as timing before the determination processing of S152.

Processing of S155 to S157 is similar to the processing of S104 to S106.

In the present embodiment, the current threshold Ith1 is made variable in accordance with the battery voltage Vbat. When the battery voltage Vbat is higher than the battery voltage lower limit Vbat_min, it is possible to widen the range where the power feeding abnormality can be determined.

Although the example of making the current threshold Ith1 variable by the battery voltage Vbat has been described, the current threshold Ith2 or the rotational frequency thresholds Nth1, Nth2 may also be made variable based on the battery voltage Vbat in a similar manner.

In the present embodiment, the determination threshold is variable in accordance with the battery voltage Vbat that is the voltage of the battery 5.

Hence, it is possible to appropriately set the determinable range in accordance with variation in battery voltage Vbat.

Further, a similar effect to those of the above embodiments is exerted.

Eighth Embodiment

Figure 12:
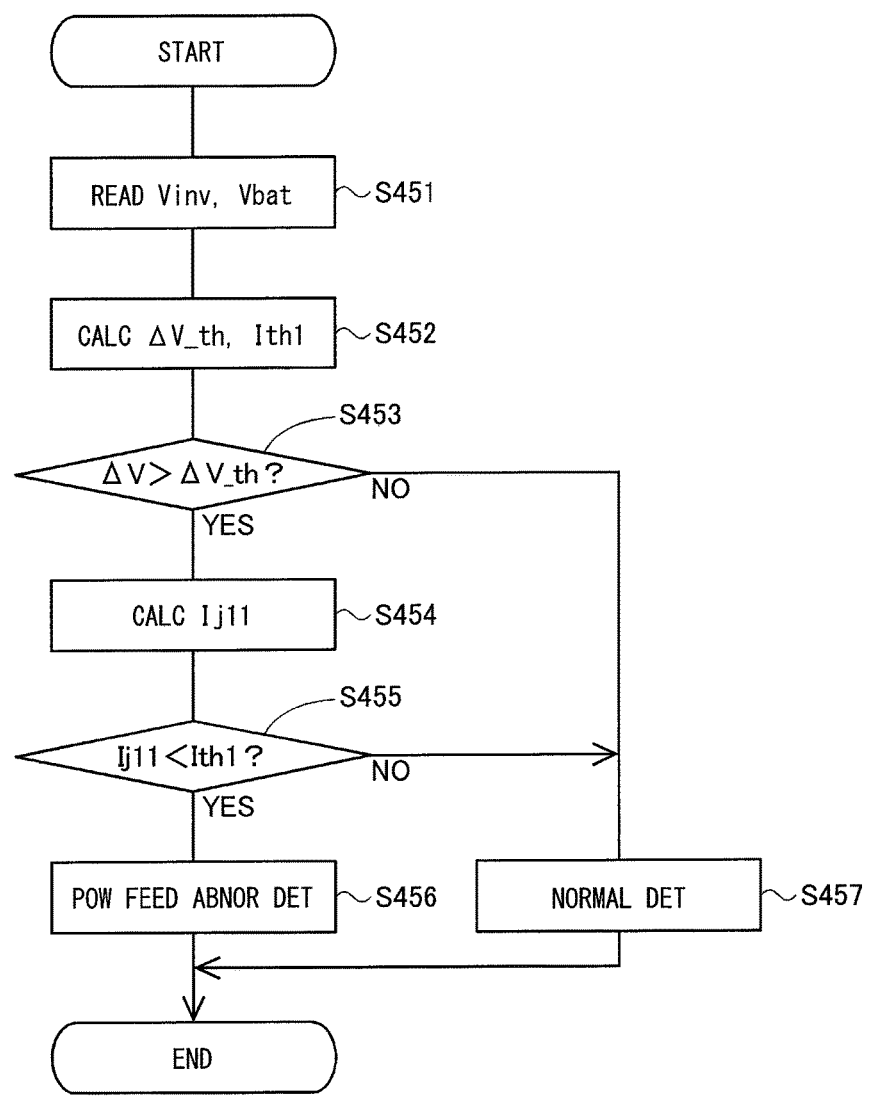
FIG. 12 is a flowchart for explaining abnormality determination processing according to an eighth embodiment of the present disclosure.

FIG. 12 shows an eighth embodiment of the present disclosure.

The abnormality determination processing in the present embodiment will be described based on a flowchart of FIG. 12.

Processing of S451 is similar to the processing of S401 in FIG. 8.

In S452, the abnormality determination part 60 calculates the drop amount threshold $\Delta V\_th$ and the current threshold Ith1 based on the battery voltage Vbat.

The drop amount threshold $\Delta V\_th$ is calculated using the battery voltage Vbat acquired in S451 in place of the battery voltage lower limit Vbat_min of Formula (2). The calculation of the current threshold Ith1 is similar to that in the seventh embodiment. Note that the current threshold Ith1 may be calculated at any timing from S451 to S455, such as timing after the determination as YES in S453.

Processing of S453 to S457 is similar to the processing of S402 to S406.

In the present embodiment, the drop amount threshold $\Delta V\_th$ and the current threshold Ith1 are made variable in accordance with the battery voltage Vbat. When the battery voltage Vbat is higher than the battery voltage lower limit Vbat_min, it is possible to widen the range where the power feeding abnormality can be determined.

Although the example has been described where the drop amount threshold $\Delta V\_th$ and the current threshold Ith1 of the fourth embodiment are made variable in accordance with the battery voltage Vbat, the drop amount threshold $\Delta V\_th$ and the current threshold Ith2 of the fifth embodiment as well as the drop amount threshold $\Delta V\_th$ and the rotational frequency thresholds Nth1, Nth2 of the sixth embodiment may also be made variable in accordance with the battery voltage Vbat in a similar manner.

Further, one of the drop amount threshold $\Delta V\_th$ and the determination threshold may be made variable in accordance with the battery voltage Vbat, and the other thereof may be made a set value regardless of the battery voltage Vbat.

In the present embodiment, the drop amount threshold $\Delta V\_th$ is made variable in accordance with the battery voltage Vbat. Hence, it is possible to more appropriately perform the power feeding abnormality determination in accordance with the battery voltage Vbat.

Further, a similar effect to those of the above embodiments is exerted.

Ninth Embodiment

Figure 13:
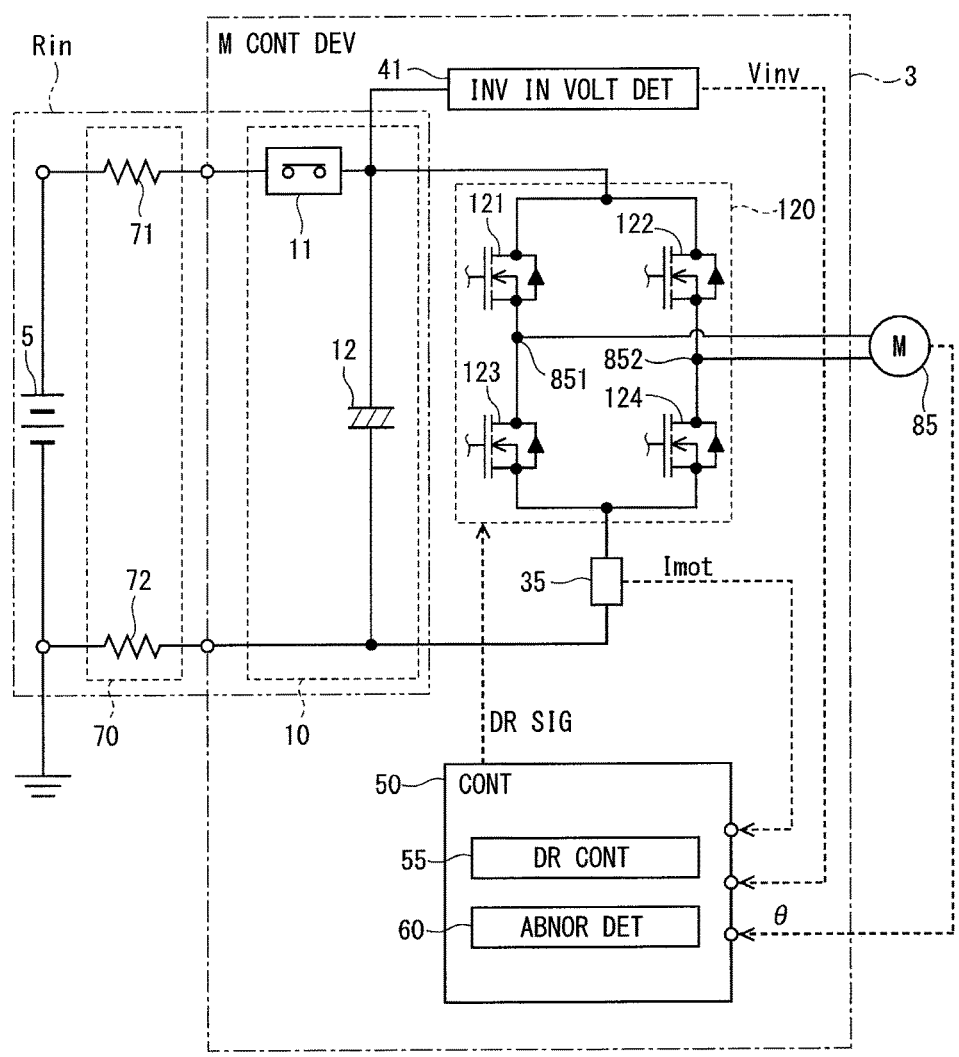
FIG. 13 is a circuit diagram showing a motor control device according to a ninth embodiment of the present disclosure.

FIG. 13 shows a ninth embodiment of the present embodiment.

As shown in FIG. 13, a motor 85 of the present embodiment is a direct-current (DC) motor with a blush.

A motor control device 3 includes the power input circuit 10, an inverter circuit 120, a current detection part 35, the inverter input voltage detection part 41, the control part 50, and the like. Note that the battery voltage detection part 42 may be provided in the motor control device 3 as in the fourth embodiment and the like.

The inverter circuit 120 is an H-bridge circuit, and has four SW elements 121 to 124. A connection point of the SW elements 121, 123 in pair is connected with one terminal 851 of a coil of the motor 85, not shown. A connection point of the SW elements 122, 124 in pair is connected with the other terminal 852 of the coil.

The current detection part 35 detects a winding current Imot that is a current to be electrically conducted to the coil of the motor 85. The current detection part 35 of the present embodiment is a shunt resistor, and an end-to-end voltage thereof is outputted to the control part 50 as a detection value in accordance with the winding current Imot.

The drive control part 55 of the control part 50 controls the drive of the motor 85 by controlling on-off operation of the SW elements 121 to 124 based on the winding current Imot, the rotational angle θ, the steering torque, or the like.

In place of the current determination value Ij11 of the first embodiment or the fourth embodiment, the abnormality determination part 60 determines whether the current drawn from the battery 5 to the inverter circuit 20 is in the determinable range based on a current determination value Ij13, to perform the power feeding abnormality determination. The current determination value Ij13 in the case of the DC motor is the winding current Imot (see Formula (14)).

$$Ij13 = Imot \quad (14)$$

Further, in place of the current determination value Ij21 of the second embodiment or the fifth embodiment, the abnormality determination part 60 may determine whether the current drawn from the battery 5 to the inverter circuit 20 is in the determinable range based on a current determination value Ij23, to perform the power feeding abnormality determination. The current determination value Ij23 in the case of the DC motor is the product of the winding current Imot and the voltage between both terminals, and expressed by Formula (15). Note that Vm1* in the formula is a voltage command value to be applied to the terminal 851, and Vm2* in the formula is a voltage command value to be applied to the terminal 852.

$$Ij23 = (Vm1^* - Vm2^*) \times Imot \quad (15)$$

Further, as in the third embodiment or the sixth embodiment, the abnormality determination part 60 may determine whether the current drawn from the battery 5 to the inverter circuit 20 is in the determinable range based on the rotational frequency N, to perform the power feeding abnormality determination.

Note that each threshold in accordance with the power feeding abnormality determination is similar to that in the above embodiment.

The motor 85 of the present embodiment is a DC motor. The current determination value Ij13 is the winding current Imot. Further, the current determination value Ij23 is the product of a voltage between the terminals (i.e., Vm1*−Vm2*) and the winding current Imot. Hence, it is possible to appropriately determine whether the current drawn from the battery 5 to the inverter circuit 20 is in the determinable range in the DC motor.

Further, a similar effect to those of the above embodiments is exerted.

Other Embodiments (I) Current Determination Value

In the first embodiment, the third embodiment, and the like, the current determination value is the square-root of sum of squares of detection values of the phase currents. In another embodiment, in calculation of the current determination value, a command value or an estimation value may be used in place of the detection value of the phase current. This also applies to the d-axis current and the q-axis current.

In the second embodiment, the fourth embodiment, and the like, in calculation of the current determination value, the detection value is used as the current value, and the command value is used as the voltage value. In another embodiment, in calculation of the current determination value, the command value or the estimation value may be used as the current value, and the detection value or the estimation value may be used as the voltage value.

Similarly in the case of the DC motor, any of the detection value, the command value, and the estimation value may be used as the motor current and the voltage between the terminals.

(II) Rotational Speed

In the third embodiment and the sixth embodiment, the rotational frequency calculated based on the rotational angle corresponds to the rotational speed. In another embodiment, a rotational angular speed may be used as the rotational speed in place of the rotational frequency. Further, in another embodiment, a terminal voltage detection part for detecting a terminal voltage of each phase may be provided, and the rotational speed may be estimated based on the detected terminal voltage.

(III) Determinable Range

In the above embodiment, the current determination value and the rotational speed are used for determination of the determinable range. In another embodiment, a value used for determination of the determinable range may be any value so long as being a value corresponding to the motor current or the rotational speed. Further, the determination threshold can be appropriately set in accordance with a value used for determination so long as the inverter input voltage at the time when the power feeding abnormality has not occurred is a value not smaller than the voltage threshold.

(IV) Current Detection Part

In the above embodiments, the shunt resistor is used for the current detection part, and it is provided on the low potential side of the low potential-side SW element. In another embodiment, a Hall element or the like, other than the shunt resistor, may be used for the current detection part. Further, where the current detection part is provided is not restricted to the low potential side of the low potential-side SW element, but it may be provided in any place where a current can be detected.

(V) Motor

The motor of the above embodiments is a three-phase AC motor or a DC motor. In another embodiment, the motor may be any one such as a motor of four or more phases.

In the above embodiments, the motor is applied to the electric power steering device. In another embodiment, the motor control device may be applied to a device other than the electric power steering device.

In the above, the present disclosure is not restricted to any of the above embodiments, and can be implemented in a variety of forms in the range not deviating from the gist of the disclosure.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control device for controlling a drive of a motor, comprising:
   an inverter circuit that supplies power of a battery to the motor;
   an inverter input voltage detector that detects an inverter input voltage to be input into the inverter circuit; and
   a controller that includes a drive controller for controlling the drive of the motor, and an abnormality determination unit for determining power feeding abnormality that the power is not fed from the battery to the inverter circuit in a power feeding region between the battery and the inverter circuit, wherein:
   the abnormality determination unit determines that the power feeding abnormality occurs when the inverter input voltage is lower than a voltage threshold and a current from the battery to the inverter circuit is in a determinable range;
   the abnormality determination unit determines, based on a motor current electrically conducted to the motor or a rotational speed of the motor, whether the current is in the determinable range; and
   a determination threshold in accordance with the determinable range is set such that the inverter input voltage is equal to or higher than the voltage threshold when the power feeding region is normal, wherein
   the abnormality determination unit determines that the current from the battery to the inverter circuit is in the determinable range when a current determination value calculated using the motor current is smaller than a current threshold as the determination threshold,
   the motor is a three-phase alternating-current motor; and
   the current determination value is a sum of values obtained by multiplying a current value and a voltage value of each phase or each dq-axis.

2. The motor control device according to claim 1, further comprising:
   a battery voltage detector that detects a battery voltage of the battery, wherein:
   the abnormality determination unit determines that the inverter input voltage is lower than the voltage threshold when a voltage drop amount is larger than a drop amount threshold; and
   the voltage drop amount is a difference between the battery voltage and the inverter input voltage.

3. The motor control device according to claim 2, wherein:
   the drop amount threshold is variable in accordance with the battery voltage.

4. The motor control device according to claim 1, wherein:
   the determination threshold is variable in accordance with a battery voltage of the battery.

5. An electric power steering device comprising:
   the motor control device according to claim 1; and
   the motor that outputs an auxiliary torque for assisting a steering operation of a driver.

6. A motor control device for controlling a drive of a motor, comprising:
   an inverter circuit that supplies power of a battery to the motor;
   an inverter input voltage detector that detects an inverter input voltage to be input into the inverter circuit; and
   a controller that includes a drive controller for controlling the drive of the motor, and an abnormality determination unit for determining power feeding abnormality that the power is not fed from the battery to the inverter circuit in a power feeding region between the battery and the inverter circuit, wherein:
   the abnormality determination unit determines that the power feeding abnormality occurs when the inverter input voltage is lower than a voltage threshold and a current from the battery to the inverter circuit is in a determinable range;
   the abnormality determination unit determines, based on a motor current electrically conducted to the motor or a rotational speed of the motor, whether the current is in the determinable range; and
   a determination threshold in accordance with the determinable range is set such that the inverter input voltage is equal to or higher than the voltage threshold when the power feeding region is normal, wherein
   the abnormality determination unit determines that the current from the battery to the inverter circuit is in the determinable range when a current determination value calculated using the motor current is smaller than a current threshold as the determination threshold,
   the motor is a three-phase alternating-current motor; and
   the current determination value is a square-root of a sum of squares of a phase current or a dq-axis current.

7. The motor control device according to claim 6, further comprising:
   a battery voltage detector that detects a battery voltage of the battery, wherein:
   the abnormality determination unit determines that the inverter input voltage is lower than the voltage threshold when a voltage drop amount is larger than a drop amount threshold; and
   the voltage drop amount is a difference between the battery voltage and the inverter input voltage.

8. The motor control device according to claim 6, wherein:
   the drop amount threshold is variable in accordance with the battery voltage.

9. The motor control device according to claim 6, wherein:
the determination threshold is variable in accordance with a battery voltage of the battery.

* * * * *